United States Patent Office.

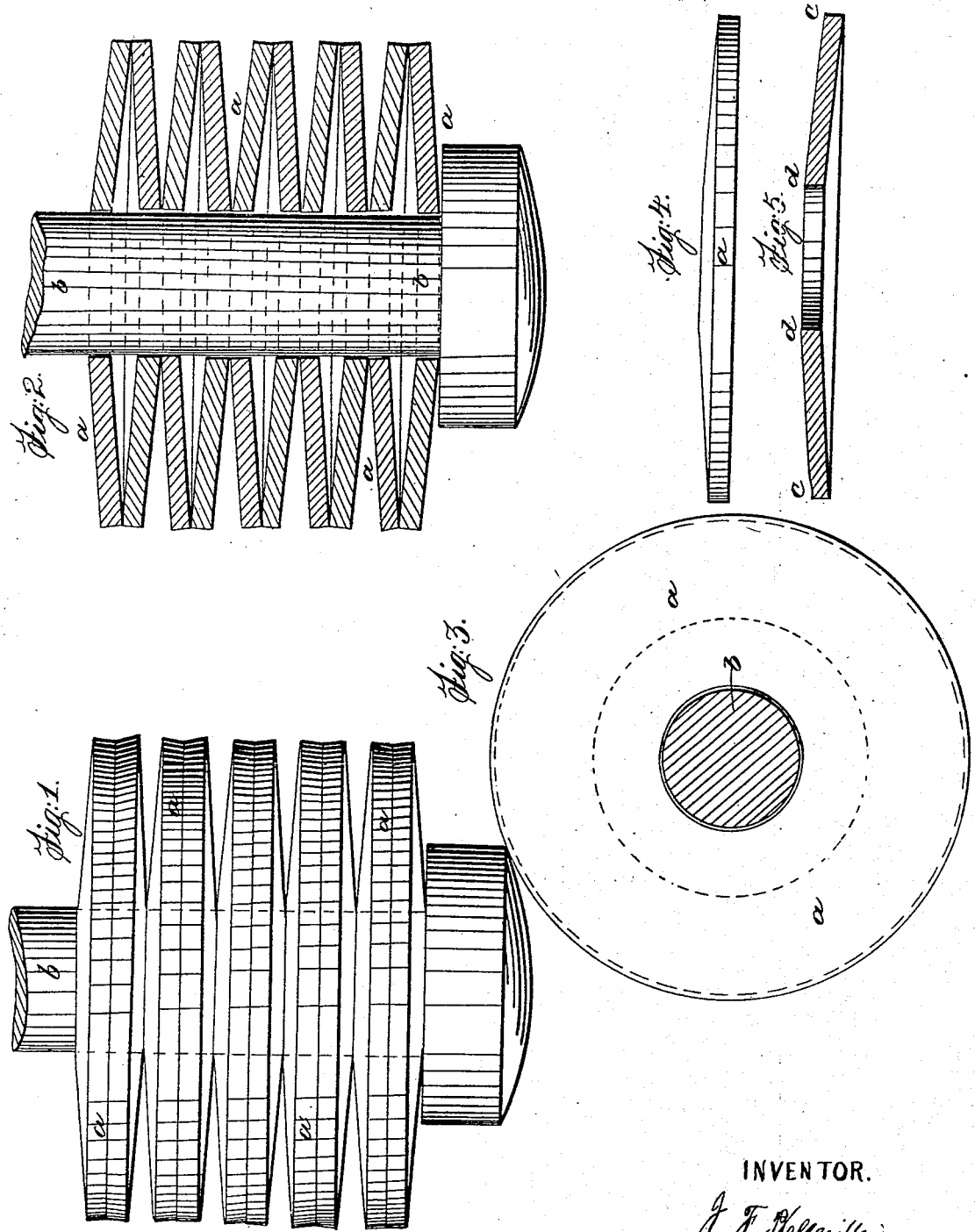

JULIEN F. BELLEVILLE, OF PARIS, FRANCE.

Letters Patent No. 65,790, dated June 18, 1867.

---

IMPROVED CAR-SPRING.

---

The Schedule referred to in these Letters Patent and making part of the same.

---

TO WHOM IT MAY CONCERN:

Be it known that I, JULIEN FRANCOIS BELLEVILLE, of Paris, in the Empire of France, have invented certain new and useful Improvements in Springs; and I hereby declare the following to be a full, clear, and exact description of the same, reference being had to the accompanying drawings.

The object of this invention is to utilize the elasticity of metallic disks of a trunco-conical shape, that is to say, conical disks, which are intersected by a plane perpendicular to the axis of the cone. These disks are united in couples and are traversed in their centre by a bolt. The couples are superposed one on the other in sufficient number to obtain any desired amount of elasticity. The disks are formed of metal of suitable elasticity and durability. Their exterior diameter, the diameter of the centre hole, their thickness, and their number in the composition of each spring are variable, according to the connection in which they are used and the resistance or pressure to which each spring is submitted. The conical form of the disks is such that they retain their elasticity or spring power until entirely compressed, so as to have a plane form. They are then in contact one with another, throughout their entire surface, in such manner that the spring becomes a block of metal of considerable resistance. As the limit of the elasticity of the disks cannot thus be exceeded they cannot be broken by a sudden shock or blow.

Figure 1 of the drawings which accompany this specification represents an exterior view; and Figure 2, a vertical section of my improved spring.

Figure 3 is a plan view of the same.

The spring is composed of metallic disks, a, having the form of a truncated cone, as shown in elevation and section in Figures 4 and 5. These disks are placed together by twos in such manner that each couple is composed of two disks, arranged so as to bring their surfaces together, or face to face. Each pair is traversed centrally by a rod or bolt, b, which serves to connect any desired number of pairs. The springs I have described cannot be put into practical use unless they are made of certain dimensions and proportions which I have only found out and determined by numerous and repeated experiments. For example, when the radius c d of the disks (that is to say, the radius of the disk less the radius of the hole which is formed in the centre) is too great in proportion to their thickness, the disks get out of shape and sink or become suddenly depressed, turning the other direction before they are brought gradually to complete flatness. This effect is produced soon according as the radius is greater in proportion to the thickness, so that this sudden deformation or sinking w be produced more readily if the radius be, for example, equal to twenty-five times the thickness of the dis than if it were but twenty times the thickness of the disk. In reducing this proportion below the poi where the sudden deformation commences to be produced, a spring is obtained whose irregular resistan is not proportionate to the load or weight it supports, because the resistance, which is very great at first becomes afterward very feeble. It is by reducing the relations of the thickness and of the radius of th disk to the proper proportion, with respect to each other, that springs are obtained in which th ance is proportionate to the load, and which effect the utilization of the material, a utilization w' from fifteen to twenty kilogrammetres for each kilograme of material. Experience has sh( that the deformation of the springs will be produced when the thickness is about one-fifth c second, that when the thickness is reduced to one-tenth or one-twelfth of the radius a spring is p no longer becomes misshapen, but of which the resistance is irregular and weak; third, that in disks which will form good springs, that is, having a resistance proportionate to the weight or l sary that the proportion of the thickness of the disks to the radius should not sensibly exceed may even be preferably below that figure, as, for example, five or six millemetres of thick millemetres of radius. The diameter of the hole in the centre should not greatly exceed ' which is sufficient for most bolts used with springs. In order that the disks may always be c form a solid block, before exceeding the limit of their elasticity, thus avoiding all danger of or broken by an undue strain, it becomes necessary that their degree of conicalness, or the the radius c d, should not exceed one-tenth of the radius, whatsoever kind of metal be ( that the form of the disks may be such as to obtain the best results, it is indispensable tha generated by right lines free from curved parts. To obtain this result it is necessary to u red heat between two concentric matrices guided, the one into the [other], by means of a concentric rod. These matrices should possess the exact conical form desired for the disks. [The] disks can thus be cut out and moulded at one operation, which renders their manufacture cheap and simple. [The] matrices are therefore arranged so as to cut the disks or steel plates at their circumference and at the same time to fill the office of a punch. The cast steel made by the Bessemer process I have found to answer best in the manufacture of these conical disks, for it is cheap and at the same time possesses the requisite solidity and elasticity.

The conical disk-springs I have described can be used with ease and facility. They are liable to lose none of their power by sliding or friction, and they may be made so as to possess any amount of resistance. They are adapted for use in any connection in which ordinary springs are employed, but especially with the running material of railroads, as buffer-springs, or for traction or suspension. In artillery, also, for deadening the recoil of guns of large calibre, and especially on board of vessels, and for many other analogous purposes. They may also be employed to particular advantage in all cases where springs of great power and resistance but of small diameter are required. In these different cases the springs may be composed either of couples of different thicknesses, yielding more or less to the weight, or of couples formed of several disks placed one in the other, in order to double, triple, or quadruple, if need be, the resistance.

Having described my invention, and the manner in which the same is or may be carried into effect, what I claim, and desire to secure by Letters Patent, is—

The spring, composed of trunco-conical disks, having the form and proportions herein specified, arranged in pairs united by means of a rod passing through the centre of the said disks, as shown and set forth.

In testimony whereof I have signed my name to this specification before two subscribing witnesses.

J. F. BELLEVILLE.

Witnesses:
   A. BLETRY,
   JNO. HAND.